April 24, 1934.  H. KETEL ET AL  1,955,965

FIFTH WHEEL CONSTRUCTION

Filed May 29, 1933  2 Sheets-Sheet 1

Inventors
Henry Ketel
Charles M. Harris
Hine Van Der Heuvel

By Torrance & Van Antwerp
Attorneys

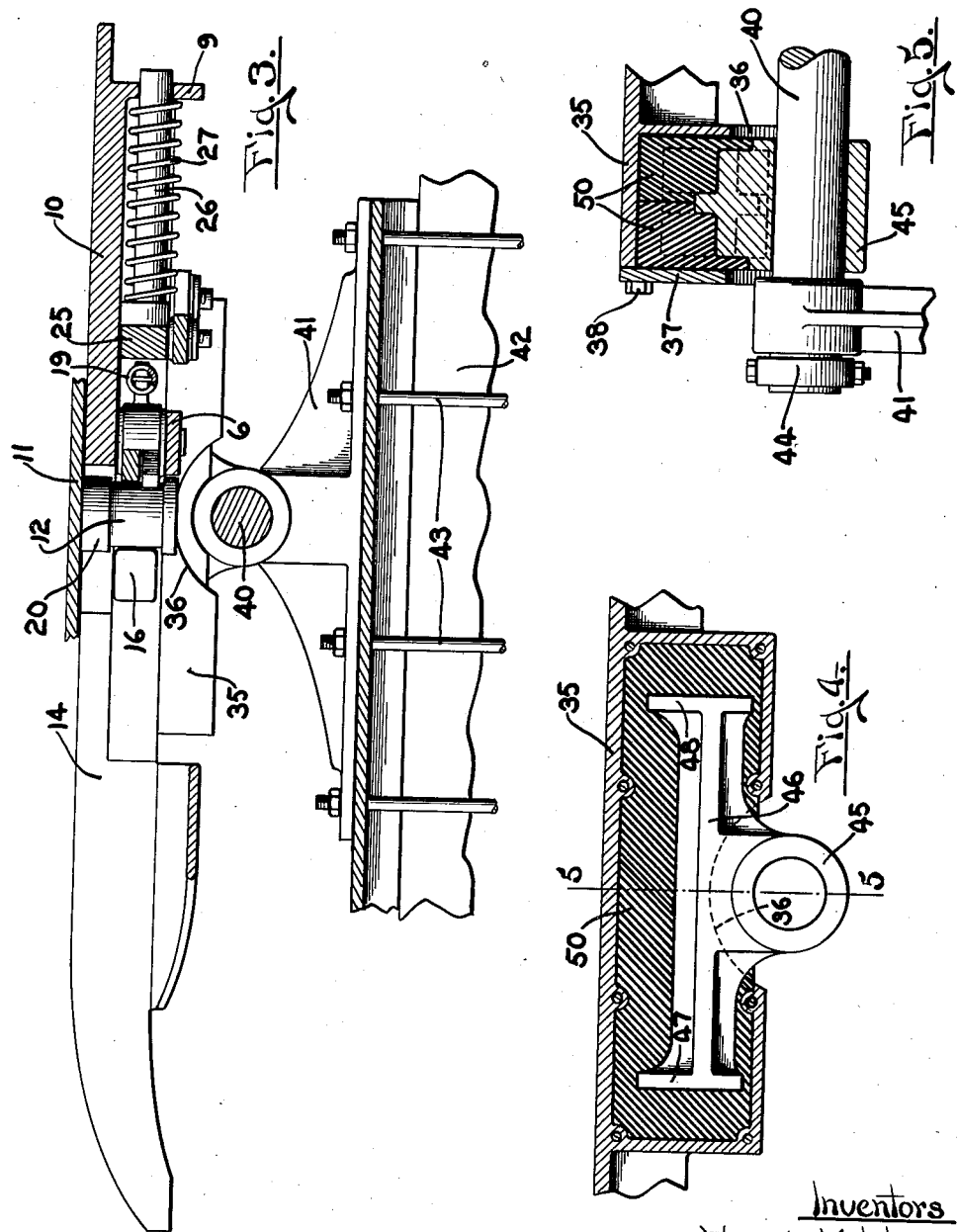

Patented Apr. 24, 1934

1,955,965

UNITED STATES PATENT OFFICE 1,955,965

FIFTH WHEEL CONSTRUCTION

Henry Ketel, Charles M. Harris, and Hine Van Der Heuvel, Holland, Mich., assignors, by mesne assignments, to West Michigan Steel Foundry Co., Muskegon, Mich., a corporation of Michigan Application May 29, 1933, Serial No. 673,328

1 Claim. (Cl. 280—33.1)

This invention relates generally to a coupling device and more particularly to a fifth wheel unit, such being normally positioned between a truck and a trailer.

Briefly described, our invention relates to a plate member tiltably mounted upon a horizontal cross shaft located upon the truck, this plate being so mounted upon the shaft as to permit considerable movement thereof not only about the pivot of the shaft but also a slight universal movement with respect thereto. In other words, a rubberized connection between the plate and shaft permits relative movement therebetween and dampens out any vibrations therebetween. Also, the plate has cooperating clamping jaws which are spring actuated to open position and which are held in closed position by means of our novel yoke member.

One of the main features of our invention resides in the slidable yoke member, such yoke member being spring pressed to its operative position wherein it encircles the outer sides of the jaws and securely and absolutely locks them in position. The yoke member may be manually withdrawn to inoperative position.

Another feature of our invention resides in the rubberized connections between either side of the plate and the horizontal cross shaft. This permitting the truck and the trailer to have relative movement about a longitudinal axis to a slight degree and, furthermore, the rubberized connections absolutely and positively damp out any shocks or vibrations between the two members. Moreover, the trailer is electrically insulated from the truck proper.

Yet another feature resides in the mounting of the rubber blocks, the construction used permitting replacement and removal whenever necessary.

Additional features of economy and simplification of construction will become apparent as the description proceeds.

Fig. 3 is a longitudinal vertical section through the fifth wheel construction showing the same mounted on the frame of a truck and showing the king pin locked in position.

Fig. 4 is a vertical section taken along the line 4—4 of Fig. 1, showing the bearing for the fifth wheel mounted in rubber.

Fig. 5 is a vertical section taken along the line 5—5 of Fig. 4.

Similar numerals refer to similar parts throughout the several views.

Figure 1:
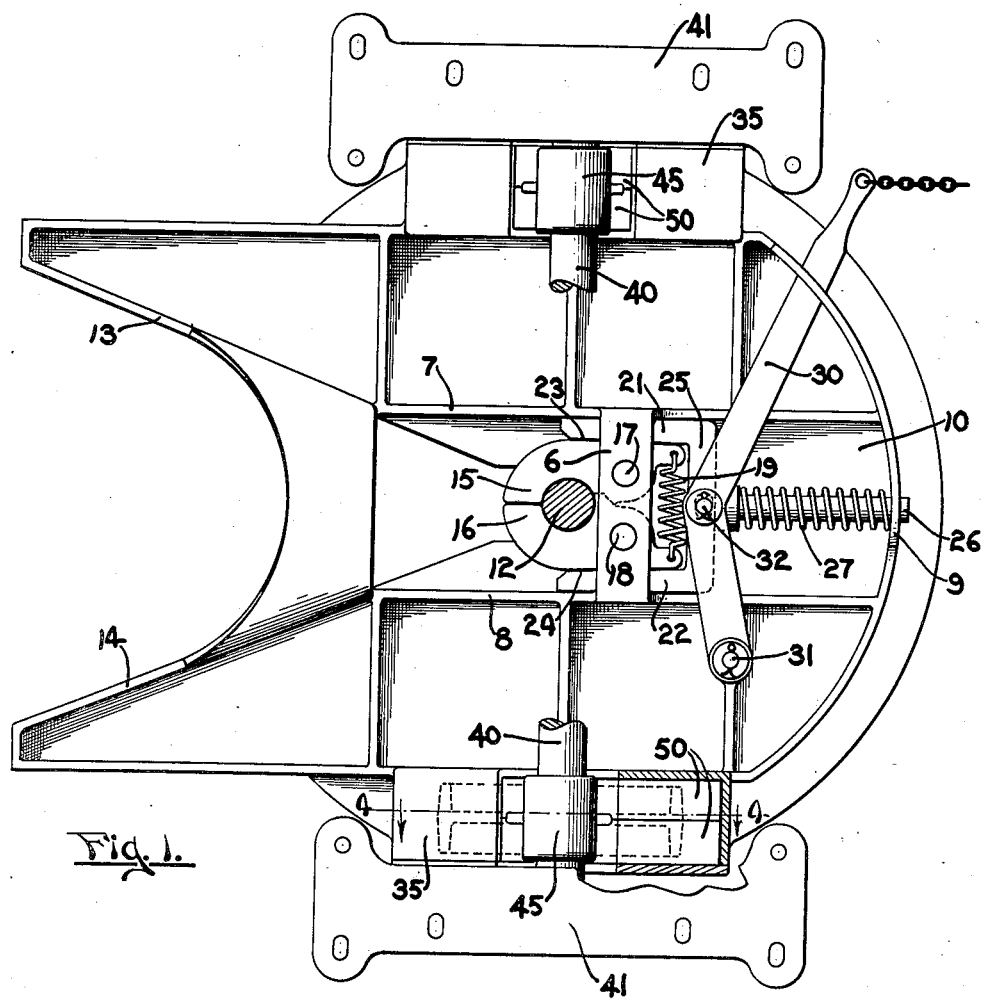
Fig. 1 is an underplan view of a fifth wheel construction made in accordance with our invention showing the king pin in cross section and the jaw in locked position around the pin.

In the drawings, numeral 10 indicates a cast member having a flat upper surface against which the upper bolster plate 11, with the king pin 12, slidingly engages, see Fig. 3. The king pin 12 has an enlarged portion 20, see Figs. 2 and 3, this portion providing an enlarged wearing integral structure. The portion 20 guides the king pin toward its locked position by camming against the guiding edges 13 and 14 as clearly shown in Figs. 1 and 2.

Figure 2:
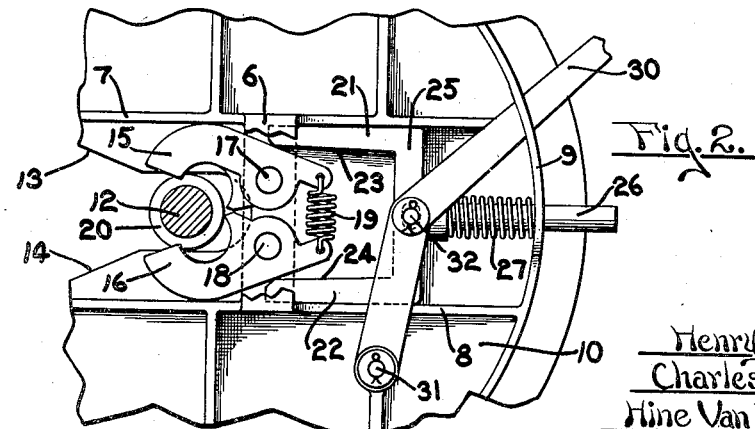
Fig. 2 is a fragmentary view of Fig. 1 with the parts shown in a position whereby the king pin is disconnected from the fifth wheel.

Jaws 15 and 16, see Figs. 1 and 2, are pivoted onto the cast element 10 as indicated at 17 and 18 and a very stout spring 19 extends between these jaws, such spring tending to pull them to open position. See Fig. 2. The jaw members are of identical construction whereby ease of manufacture is had.

The locking yoke has spaced apart arms 21 and 22, these arms being tapered at their inner sides as indicated at 23 and 24 respectively, and are rigidly connected by the cross member 25. A cylindrical guide member 26 extends outwardly from said cross member 25 through the flange or reinforcing rib 9 of the cast element 10. A spring 27 encircles the member 26 abutting at one end against the rib 9 and at its other end against the cross member 25 whereby the yoke is normally urged toward operative position. The yoke is guided by means of the spaced parallel ribs 7 and 8, such ribs depending from the cast member 10. A cross rib or member 6, shown partly broken away in Fig. 2, also serves to guide the yoke member and this rib 6 also provides a mounting for the lower ends of the pivot pins 17 and 18. A manually operated locking lever 30 is pivoted at 31 onto the lower side of the cast element 10 and has a lost motion connection at 32 with the yoke member whereby operation of the lever 30 withdraws the yoke member from its operative position as shown in Fig. 1 to its inoperative position as shown in Fig. 2.

The operation of the several parts just recited is readily understood. Before engagement the manually operated lever is pulled to the position shown in Fig. 2 against the compression of the spring 27 and, as the spring 27 is of relatively light construction and as the functioning of such spring is not directly against the jaws, it does not close the jaws when the lever 30 is released but the parts remain in the position shown in Fig. 2. The truck and the trailer are now relatively moved so that the king pin 12 rides against the inner projections of the jaws and causes them to move inwardly to their locked position as shown in Fig. 1, such tensioning the stout spring 19, whereupon the spring 27 becomes operative and slides the yoke along either side of the jaw members and securely locks them in position. Release of the mechanism is had by operating the lever 30 to the position shown in Fig. 2 whereupon the stout spring 19 opens the jaws 15 and 16 and permits withdrawal of the king pin 12.

Referring now to Figs. 1, 4 and 5, numeral 35 indicates generally the rubberized connections located one at each side of the plate member 10. As such connections are identical only one will be described in detail. The plate member 10 has a box-like construction with an opening 36 at its lower side, a detachable plate 37 being bolted thereto as indicated at 38. The pivot shaft 40, such extending crosswise of the truck, is supported upon brackets 41, such brackets being connected to the truck frame 42 by means of bolts 43 in the usual manner. Collars 44 prevent endwise movement of the shaft 40.

Floating bearing members having encircling portions 45, see Figs. 4 and 5, encircle the pivot shaft 40 and have irregularly shaped extensions 46 extending upwardly therefrom, these extensions 46 being located interiorly of the box members, the portion 45 extending downwardly through the opening 36.

Two rubber cushion members 50, of identical construction, encase the irregularly shaped jaws 46 of the floating bearings and provide yielding movement therefor in all directions and particularly in a direction so as to permit movement about a longitudinal axis of the truck and the trailer. That is, the portions of the rubber directly above the irregularly shaped extension and directly below the same yield so as to permit this desirable movement about a longitudinal axis.

Also, the irregularly shaped member has flat end plates 47 and 48 which serve to abut against and compress the encircled rubber to permit sufficient movement in this direction. Removal and replacement of the rubber blocks 50 is accomplished by removing the plates 37 and the collars 44 and then shifting the shaft 40 so that the floating bearing may be withdrawn from its housing.

From the above description it will be appreciated that our invention provides a very sturdy and very efficient construction which will admirably serve the several purposes for which it is intended and consequently we desire to protect the same by the broad claim herewith submitted.

We claim:

In a fifth wheel construction including upper and lower fifth wheel elements and a horizontal cross shaft pivotally mounted on a chassis; the combination of a hollow housing carried by the lower fifth wheel element above said cross shaft and having a removable side wall; a bearing member journalled on said shaft and having an elongated portion disposed within and extending longitudinally of said housing, said elongated portion terminating in vertically disposed laterally extending buffer plate portions; and a pair of longitudinally extending cushioning members arranged one on each side of said elongated portion and in close contact with the walls of said housing throughout their entire inner surface area to confine said cushioning members against bodily movement relative to said housing, said cushioning members having complementary recesses therein conforming to the configuration of the sides of said elongated portion, whereby said cushioning members may be freely moved out of engagement with said elongated portion and buffer plate portions for removal from said housing when said side wall is removed.

HENRY KETEL.
CHARLES M. HARRIS.
HINE VAN DER HEUVEL.